Patented Aug. 23, 1927.

1,639,725

UNITED STATES PATENT OFFICE.

CECIL JOHN TURRELL CRONSHAW AND WILLIAM JOHNSON SMITH NAUNTON, OF MANCHESTER, ENGLAND, ASSIGNORS TO BRITISH DYESTUFFS CORPORATION LIMITED, OF MANCHESTER, ENGLAND, A CORPORATION OF GREAT BRITAIN.

PROCESS FOR THE MANUFACTURE OF DIARYLGUANIDINES.

No Drawing. Original application filed June 28, 1926, Serial No. 119,266. Divided and this application filed March 2, 1927, Serial No. 172,198, and in Great Britain July 4, 1925.

Diphenylguanidine has recently been manufactured in considerable quantities as an accelerator for use in the vulcanization of rubber. The manufacturing processes adopted consist in the desulphurizing of thio-carbanilide by various processes. A completely different laboratory process for the manufacture of this body has been known since 1848. This process consists in the treatment of aniline with cyanogen chloride, dry vapors of cyanogen chloride being aspirated through liquid aniline, with condensation of the cyan-anilide obtained to form diphenylguanidine; this being isolated in suitable ways from the more or less resinous mixture of products of reaction. The first description of this method was by Hoffmann in a paper read to the Chemical Society in June, 1848 (see the Quarterly Journal of the Chemical Society of the years 1849 and 1850, also Annalen der Chemie und Pharmacie, 1848, Vol. 67, page 129, and also Cahours and Cloëz Annalen, 1854, Vol. 90, page 93). The processes described in these references can no doubt be readily carried out, using proper precautions, in the laboratory, but they are not suitable for the manufacture of the diarylguanidines on any large scale. It is not practicable on a large scale to pass vapors of cyanogen chloride or of cyanogen bromide through aniline, toluidine or the like. The reaction is so violent as to be almost explosive, and is particularly dangerous in view of the poisonous nature of the cyanogen compounds employed. Further, in the said descriptions it is repeatedly recommended that dry, water-free material should be used. The presence of water is stated to exert a deterrent effect upon the condensation, giving low yields of the desired base, amongst other reasons because of the polymerization of the cyanogen chloride to cyanuric chloride. This view we have found to be incorrect. Water is not harmful and, on the other hand, the presence of liquid water is advantageous as aiding in the regulation of temperature and moderating the violence of the reaction. Polymerization of simple cyanogen chloride to cyanuric chloride is likewise of no detriment.

The present invention avails itself of this known reaction between aniline or its homologues and cyanogen chloride and cyanogen bromide, but we have discovered conditions under which said reaction can be carried out on a manufacturing scale without undue danger. In particular the cyanogen halide is not used as gas or vapor, thereby simplifying the apparatus and avoiding danger to workmen. In our process, we work in the presence of water although water is not substantially a solvent for the cyanogen chloride and bromide, but in our method of working, water does not exert an injurious effect, but it helps in the regulation of the temperature, which is important, and substantially quantitative yields are obtained.

Our process can be applied on the one hand to aniline and to its analogues and on the other hand either cyanogen chloride or cyanogen bromide can be used but in the present application we do not claim generically the treatment of the mono-amines of the benzene series with cyanogen halides according to our general process; this being claimed in another and copending application Serial No. 119,266, filed June 28, 1926, whereof the present application is a division.

In this application we desire to claim the treatment of the mono-amines of the benzene series with cyanogen bromide according to our process, and specifically the treatment of aniline with cyanogen bromide, particularly when the said treatment is combined with the production of the said bromide in one operation.

It is a feature of our process that we do not pass the vapour of cyanogen chloride or of bromide through aniline or the like but on the contrary in using the chloride we run the aniline (for instance) slowly into a cold, violently agitated mixture of liquid cyanogen chloride and water. The stirring is continued whilst keeping the mixture cool till the production of the insoluble cyan-anilide is complete; then the temperature is raised to about 90° C. for about 4 hours, when a clear solution of diphenylguanidine hydrochloride is obtained. On running this clear solution into hot caustic soda solution, diphenylguanidine of high purity in substantially theoretical quantity is obtained.

It will be readily understood that instead of aniline, toluidine or other mono-amines of the benzene series can be used.

Cyanogen bromide can be used in the same way as the cyanogen chloride in the above described example and being much less volatile than the chloride, its poisonous action is not so dangerous, and it is more easily handled and maintained in the liquid condition. Further, there is the advantage that the production of cyanogen bromide and its reaction on aniline or the like can be effected in the same vessel. It is not necessary to produce it elsewhere, purify it and then transfer it to the reaction vessel with the incident danger of handling. The presence of sodium or potassium bromide, the by-products formed in making cyanogen bromide from solutions of postassium or sodium cyanide with bromide, are not injurious in the reaction of the present invention. For this purpose, in this embodiment of our invention, the requisite amount of bromine is placed in a closed pan and covered with water, and the whole cooled to a low temperature. The theoretical quantity of a soluble cyanide, such as sodium cyanide or potassium cyanide, in solution is then run slowly on to the mixture whilst thoroughly stirring. If the temperature is kept sufficiently low, the formation of solid cyanogen bromide can be observed. At the end of the addition of the alkali cyanide, the reacton mixture should have a faint yellow colour due to the presence of a little bromine. Whilst still maintaining thorough cooling conditions, the theoretical quantity of aniline or the like is run gradually into the violently stirred mixture and the stirring continued until the formation of cyan-anilide is observed; then the temperature is raised to 80–85° C. for about 3 hours or more, and the resulting clear solution is run into hot caustic soda solution.

What we claim and desire to secure by Letters Patent is:—

1. A process for the improvement in the manufacture of diarylguanidines, which consists in treating mono-amines of the benzene series with cyanogen bromide in the presence of water and condensing by heating the cyan-arylide so obtained to form a diarylguanidine.

2. A process for the improvement in the manufacture of diphenylguanidine, which consists in treating aniline with cyanogen bromide in the presence of water and condensing by heat the cyan-anilide so obtained to form diarylguanidine.

3. A process for the improvement in the manufacture of diaphenylguanidine, which consists in treating aniline with liquid cyanogen bromide in the presence of water, with cooling and violent agitation and subsequent by condensing the cyan-anilide so obtained to form diarylguanidine by raising the temperature to 80–85° C.

4. In the manufacture of diarylguanidines via cyanogen bromide the process which comprises treating a water solution of an alkali metal cyanide with bromine in the amount necessary to form cyanogen bromide and a solution of an alkali metal bromide, adding a liquid mono-amine of the benzene series to the reaction products thus produced and allowing interaction between the cyanogen bromide and the mono-amine, and thereafter condensing the cyan-arylide to form diarylguanidine so obtained by raising the temperature to about 80 to 85° C.

5. In the manufacture of diphenylguanidines via cyanogen bromide the process which comprises treating a water solution of an alkali metal cyanide with bromine in the amount necessary to form cyanogen bromide and a solution of an alkali metal bromide, adding liquid aniline to the reaction products thus produced and allowing interaction between the cyanogen bromide and the aniline, and thereafter condensing the cyan-anilide so obtained to form diarylguanidine by raising the temperature to about 80 to 85° C.

In testimony whereof we affix our signatures.

CECIL JOHN TURRELL CRONSHAW.
WILLIAM JOHNSON SMITH NAUNTON.